United States Patent [19]

Wood

[11] Patent Number: 4,762,298

[45] Date of Patent: Aug. 9, 1988

[54] SUPPORT AND MANEUVERING DEVICE

[75] Inventor: Richard L. Wood, Arvada, Colo.

[73] Assignee: The United States of America as represented by the United States Department of Energy, Washington, D.C.

[21] Appl. No.: 28,934

[22] Filed: Mar. 23, 1987

[51] Int. Cl.⁴ ............................................. F16M 11/12
[52] U.S. Cl. ........................................ 248/179; 52/2; 126/424; 254/93 HP
[58] Field of Search ............... 248/179, 499, 161, 651; 126/424, 425; 52/2 L, 2 P; 254/286, 93 HP

[56] References Cited

U.S. PATENT DOCUMENTS

| | | | |
|---|---|---|---|
| 3,480,241 | 11/1969 | Moyer | 248/499 X |
| 3,484,788 | 12/1969 | Bell et al. | 52/2 X |
| 3,872,854 | 3/1975 | Raser | 126/424 |
| 3,974,756 | 8/1976 | Long | 52/2 X |
| 4,249,515 | 2/1981 | Page | 126/424 X |

FOREIGN PATENT DOCUMENTS 578789 7/1946 United Kingdom ............... 248/499

Primary Examiner—David L. Talbott
Attorney, Agent, or Firm—Kenneth C. Richardson; James W. Weinberger; Judson R. Hightower

[57] ABSTRACT

A support and maneuvering device includes an elongated flexible inflatable enclosure having a fixed end and a movable end. The movable end is collapsible toward the fixed end to a contracted position when the enclosure is in a noninflated condition. Upon inflation, the movable end is movable away from the fixed end to an extended position. The movable end includes means for mounting an article such as a solar reflector thereon. The device also includes a plurality of position controlling means disposed about the movable end to effect adjusting movement of portions thereof by predetermined amounts and for controlling an angle at which the article disposed at the movable end is oriented. The plurality of position controlling means limits a suitable number degrees of freedom of the movable end for transmitting a steering motion thereto and for controlling the position thereof.

19 Claims, 4 Drawing Sheets

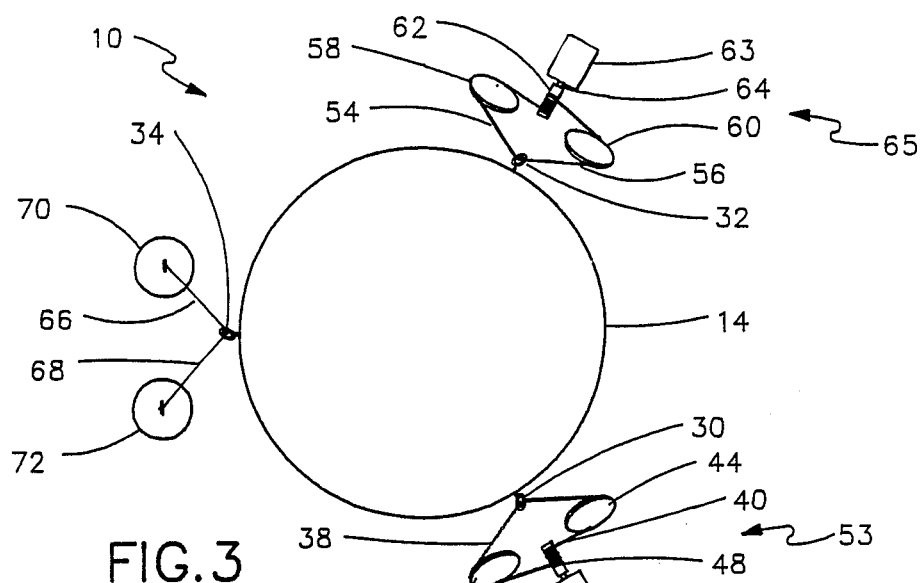
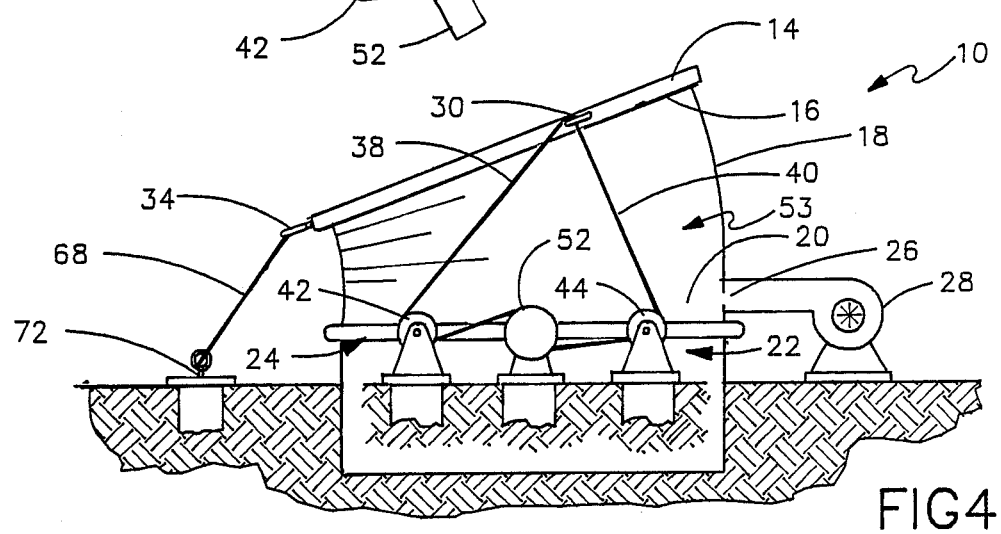
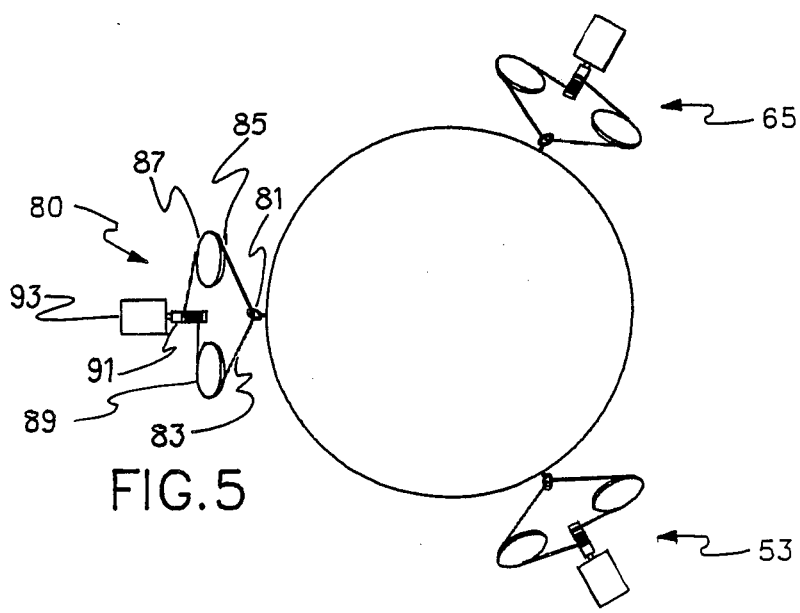

SUPPORT AND MANEUVERING DEVICE

CONTRACTURAL ORIGIN OF THE INVENTION

The U.S. Government has rights in this invention under Contract No. DE-AC02-83CH10093 between the U.S. Department of Energy and the Solar Energy Research Institute, a Division of Midwest Research Institute.

BACKGROUND OF THE INVENTION

1. Field of Invention

The present invention relates generally to a support and maneuvering device for tracking, aiming, and steering applications and, more particularly, to a support and maneuvering device for solar heliostat/collector steering applications.

2. Description of the Prior Art

Generally speaking, conventional solar heliostat/collector structures are relatively large, having mirror diameters in many instances of approximately three to ten meters. The mounting arrangement for supporting the heliostat mirror and the drive mechanism for steering or maneuvering the mirror is, thus, usually of considerable size and mass. For example, in order for the conventional bulkier heliostat structure to withstand overturning wind forces, a central pedestal for the drive mechanism and for the mirror normally comprises a massive metal post to avoid buckling and a massive concrete foundation to prevent uprooting or overturning.

In addition, maneuvering the heliostat mirror usually requires costly support shaft bearings and geared drive motors. The production and installation costs for these drives, pedestals and foundations represent a large portion of a total cost of central receiver solar power systems that utilize heliostats. Such costs are a substantial factor in determining a feasibility of maintaining such systems.

Recently, in an attempt to reduce the material, fabrication and maintenance costs of prior art heliostats and their allied structures, a heliostat mirror or reflector has been formed from a stretched membrane of polymeric or metallic materials. The reflector module usually includes a rim or frame to which a stretched membrane is attached. Unfortunately, since some types of stretched membranes are relatively delicate, it is often not feasible to join such membranes directly to a reflector support frame, the drive mechanism, or other support structure.

One known method of providing a support and drive capability for the prior art stretched-membrane heliostat mirror is through a support spider. The support spider is constructed of rods having first ends attached to the rim of the stretched membrane and opposite ends converging to a junction zone that connects to a drive and support arrangement. However, unfortunately, usually the connection of the support spider to the rim of the heliostat mirror and to the drive mechanism and support pedestal is an intricate arrangement that also requires the use of costly support shafts, bearings and geared drive motors.

SUMMARY OF THE INVENTION

Against the foregoing background, it is therefore a general object of the invention to provide a novel, lightweight, low-cost, and easily replaceable support and maneuvering device for solar energy conversion articles that overcomes the disadvantages and shortcomings of prior art types.

It is another general object of the invention to provide a novel drive arrangement for a solar reflector that does not require a support spider or a support pedestal.

It is a still further general object of the invention to provide a novel method of supporting and maneuvering a solar reflector.

It is a more specific object of the invention to provide a novel inflatable support for a solar reflector.

It is still another specific object of the invention to provide a novel drive arrangement for a solar reflector of a heliostat/collector assembly that operates directly on a support rim of the reflector.

Additional objects, advantages, and novel features of the invention shall be set forth in part in a description that follows, and in part will become apparent to those skilled in the art upon examination of the following, or may be learned by the practice of the invention. The objects and the advantages of the invention may be realized and attained by means of the instrumentalities and combinations particularly pointed out in the appended claims.

To achieve the foregoing and other objects, and in accordance with a purpose of the present invention, as embodied and broadly described herein, the support and maneuvering device includes an elongated, flexible, inflatable enclosure having a fixed end and a movable end. The movable end is collapsible toward the fixed end to a contracted position when the enclosure is in a noninflated condition. Upon inflation, the movable end is movable away from the fixed end to an extended position. The movable end includes a means for mounting an article such as a solar reflector thereto.

The support and maneuvering device further includes a plurality of position controlling means. During inflation, the position controlling means adjust movement of portions of the movable end by predetermined amounts and control an angle at which an article disposed thereat is oriented to effect steering. Also, the plurality of position controlling means provides adjustable limits for a suitable number of degrees of freedom of the movable end to effect transmitting a steering motion thereto in all desired directions.

BRIEF DESCRIPTION OF THE DRAWINGS

The accompanying drawings of the support end and maneuvering device, which are incorporated in and form a part of the specification, illustrate various embodiments of the present invention and together with the description to explain the principles of the invention, wherein:

FIG. 3 is a simplified schematic plan view of FIG. 1;

FIG. 4 is a side elevation illustrating the support and maneuvering device oriented in a position different from that of FIGS. 1 and 2;

FIG. 5 is a simplified schematic plan view illustrating a variant of the first embodiment of FIG. 1;

Corresponding reference characters indicate corresponding parts throughout the several views of the drawings.

DETAILED DESCRIPTION OF THE PREFERRED EMBODIMENTS OF THE INVENTION

Figure 1:
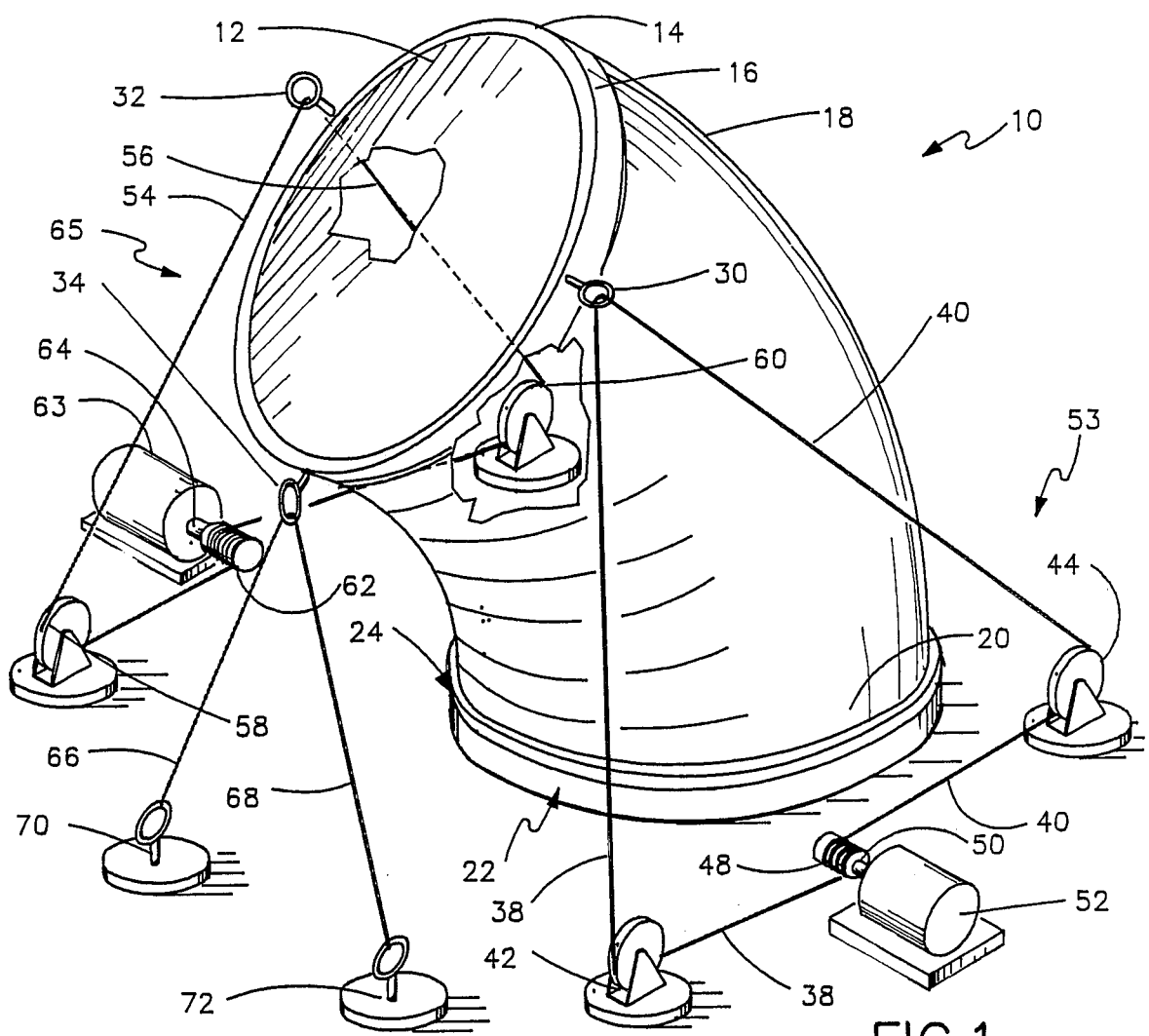
FIG. 1 is a perspective view, partly broken, of a support and maneuvering device incorporating one embodiment of the invention.

Referring now to the drawings, and more particularly to FIGS. 1-4 thereof, the present invention relates to a support and maneuvering device 10 for tracking, steering and aiming applications. Generally, the support and maneuvering device 10 provides support for rigid articles that require a controlled variation of position and attitude. Examples of such articles are a telescope, a photovoltaic device, or a solar receiver.

In a preferred heliostat/collector tracking and steering application, the device 10 is used to support and steer a thin film-type reflector or mirror 12. The reflector 12 is steered to reflect solar rays onto a fixed receiver or an absorber of a central receiver solar power system. The solar rays are caused to be focused onto the receiver despite a continuously changing position of the sun throughout the day.

It should be understood that the specific details of the reflector 12 form no part of the present invention. Accordingly, the reflector 12 may be formed of any well known material suitable for providing a thin film reflective surface. Examples are polymeric materials, glass materials, or metallic materials.

Preferably, the reflector 12 is in the form of a conventional stretched-membrane-type heliostat. A substantially similar stretched-membrane heliostat is disclosed in, "Technical and Cost Benefits of Lightweight, Stretched-Membrane Heliostats" by L. M. Murphy of the Solar Energy Research Institute (SERI) in a publication No. SERI/TR-253-1818, DE83009408. The SERI/TR-253-1818 publication is presently available from the National Technical Information Service, U.S. Department of Commerce, Springfield, Va.

Additionally, the invention is not limited to heliostat/collector steering and tracking applications. It can also be adapted to other applications that require controlled variation of position and attitude, as will occur to persons skilled in the support and maneuvering device art.

The support and maneuvering device 10 includes an elongated, cylindrical resiliently flexible, inflatable enclosure or bag 18. The bag 18 is preferably formed from a polymeric material, such as polyvinyl chloride. The bag 18 also includes a free or movable bag end 16 that is longitudinally spaced from a opposite fixed bag end 20. The bag 18 further defines an unitary, virtually airtight, inflatable, containment chamber therein.

It will be appreciated, however, that the bag 18 is not limited to the unitary chamber construction and can comprise multiple inflation chambers. Similarly, the bag 18 is not limited to a polymeric-type bag material or limited to a cylindrical shape. The bag 18 can comprise a number of other configurations having adequate rigidity for allowing a suitable amount of torsional movement about its longitudinal axis, as will occur to those skilled in the art. One example of another configuration is a bellows-type shape, while an example of another bag material is a wire-hose-type constructed bag. In the latter bag, a flexible material covers a helical-shaped spring.

The bag 18 also includes a rim 14 which is preferably formed of steel. The rim 14 is circumferentially attached to the bag 18 adjacent the free bag end 16. The rim 14 and the free bag end 16 serve to receive and to support the reflector 12. The reflector 12 is bonded to the rim 14 and a traverse circular-shaped planar region defined by the free bag end 16, as is best illustrated in FIG. 1.

The opposite fixed bag end 20 is secured to a periphery of a support and anchoring base 22 using conventional fastening techniques. In the preferred fastening technique, the fixed bag end 20 secured to the base 22 with a clamping ring 24. The base 22 is preferably formed of concrete but can be formed from other suitable materials, such as a sand or gravel-filled polymer sleeve. Such a sleeve is commonly used to secure portable inflated buildings.

Figure 2:
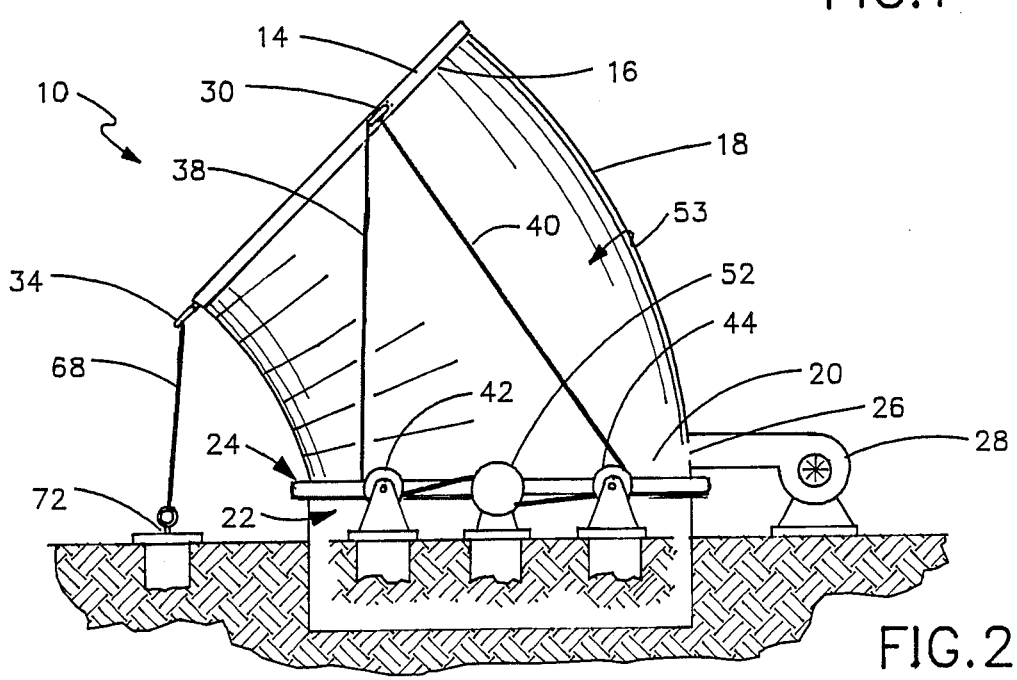
FIG. 2 is a side elevation of FIG. 1 with the support and maneuvering device in an inflated condition.

An inlet opening or valve 26 for communicating with a conventional low pressure fan or blower 28 is provided near the fixed bag end 20, as is best illustrated in FIGS. 2 and 4. The blower 28 functions to inflate the bag 18 to a suitable range of pressures of from about 0.1 lbs/sq. in. (0.05 kg/sq. in.) to about 0.2 lbs/sq. in. (0.09 kg/sq. in.). Such a blower 28 is well known in the art and has been omitted from the drawings to simplify the details thereof.

The bag 18 can be continuously inflated to a desired volume throughout the operation of the device 10, or it can be inflated to the desired volume in a single act. In a deflated condition, the free bag end 16 is collapsible toward the fixed bag end 20 to effect a contracted position adjacent the fixed bag end 20. In an inflated condition, the free bag end 16 is movable in a longitudinal direction along a cylindrical axis of the bag 18 away from the contracted position to an extended position. Notably, when the bag 18 is inflated and unrestrained, the feed bag end 16 is enabled to rotate so as to sweep an arc in planes normal to the fixed base 22.

Three cable securing members or cable securements 30, 32 and 34 are removably attached to the rim 14. The cable securement 30, 32 and 34 are circumferentially spaced about the rim 14 at attachments generally corresponding to desired directional points of a compass or the degrees of a circle. The spacing of the cable securements about the rim assists in allowing steering in a desired angular direction, as will become more apparent herein below.

In a preferred spacing arrangment, the securements 30, 32 and 34 are steel mounting swivel-type eye or swedged-type eye fasteners. They are spaced about 120° from one another. For example, as is best seen in FIG. 3, the securing member 30 is in the five o'clock position on the rim 14, the securing member 32 is in the one o'clock position, and the securing member 34 is in the nine o'clock position.

It will be understood, however, that the cable securements are not limited to being attached to the rim 14. They can be located at portions of the article supported thereon, as will occur to those skilled in the art. For example, the reflector 12 could comprise a fairly rigid structure and have a diameter greater then that of the air bag 18. Satisfactory cable connections could then be made to perimeter portions of the reflector 12.

To continue, first ends of a pair of external control cables 38 and 40 are tied or hitched to the cable securing member 30. The cables of the present invention comprise metal, preferably galvanized flexible steel wire ropes. The cables 38 and 40 can be hitched in any known manner suitable for allowing the cables 38 and 40 to freely pivot about the mounting eye of the swivel-type cable securing member 30.

Remaining ends of the cables 38 and 40 extend around ground rollers 42 and 44, respectively, for takeup on a motor drum 48. The ground rollers 42 and 44 and the motor drum 48 can be secured to the ground by a number of conventional holding techniques. Two examples include concrete pillars and cleats. Preferably, the ground rollers 42 and 44 and the motor drum 48 are firmly secured by driven pilings not herein shown.

The drum 48 is keyed to an output shaft 50 of a drive means such as a motor 52. The drum 48 receives windings of the control cables 38 and 40 in separately spaced single layers. Receiving the cables in single layers allows each rotation of the motor shaft 50 to simultaneously wind or unwind both branches or sections of the cables 38 and 40 between their associated pulleys the same predetermined amount. Whether or not the cable branches are being wound or paidout will depend upon the direction of rotation of the motor shaft 50. Additionally, the drum and motor components 48 and 52, respectively, function to adjust the length of the cable branches 38 and 40, as will be more fully explained herein below.

The motor 52 preferably comprises a stepper-type motor, but can be any drive means having a suitable constant low-speed output. If desired, appropriate conventional speed reducers can be provided between the drum 48 and the motor shaft 50. It will be understood, however, that the conventional speed reducers form no part of the present invention. Thus, they have been omitted from the drawings for the sake of clarity.

Pursuant to the present invention, the cables 38 and 40 have a common connection to the rim 14 at the securing member 30. By this common connection, the cables 38 and 40 in combination with the drum and motor components 48 and 52, respectively, and the ground rollers 42 and 44 form a first, one-point, adjustable, position control 53.

The control 53 provides adjustable limits for two degrees of freedom of the free end 16, one degree of freedom being associated with each one of the two cables 38 and 40. In this regard, control 53 allows a steering movement or motion to be transmitted to a portion of the movable end 16 adjacent the securing member 30. The transmitted steering motion allows the position of the movable end to be controlled.

First ends of another pair of external control cables 54 and 56 are jointly tied to the cable securing member 32. Remaining ends of the cables 54 and 56, respectively, extend around ground rollers 58 and 60 for takeup on a motor drum 62. The drum 62 is operatively connected to a motor 63 through a shaft 64. The ground rollers 58 and 60 and the motor drum 62, as noted above, can be secured to the ground by concrete pillars, driven pilings or cleats, which are not shown herein.

The interconnecting arrangement of the cables, the cable securing members, the ground rollers, and the drum and motor components allows the cable branches or sections between the securing member 32 and the rollers 44 and 58 and 60 to be paid out or taken up at equal rates, when the drum 62 is turned by the motor 63. In this regard, it will be noted that the structure and function of the drum 62, the shaft 64 and the motor 63 are identical to the structure and function of the drum 48, the shaft 50 and the motor 52.

Pursuant to the invention, cables 54 and 56 have a common pivotal connection to the rim 14 at the securing member 32. By this common connection, the cables 54 and 56 in combination with the drum and motor 62 and 63, respectively, and the two ground rollers 58 and 60 form a second, one-point, adjustable, position control 65.

The second control 65 also provides adjustable limits for two degrees of freedom of free end 16, one degree of freedom being associated with each one of the two cables 54 and 56. The control 65 also functions to allow a steering motion to be transmitted to a portion of the movable end 16 adjacent the securing member 32 to effect controlling its angular position and longitudinal extension.

Lastly, device 10 includes a pair of external, fixed length, restraining cables 66 and 68. First ends of the cables 66 and 68 are tied to the cable securing member 34. The securing member 34 forms a fixed pivot point for a rotation thereabout of the free bag end 16. Remaining ends of the two cables 66 and 68 are secured to ground anchors 70 and 72, respectively.

Pursuant to the invention, the cables 66 and 68 function as fixed position controlling cables or nonadjustable restraining cables and provide non-adjustable limits for the remaining two degrees of freedom of the free end 16. Moreover, the cables 66 and 68 aid the two one-point, adjustable, orientation controls 53 and 65 in steering the free bag end 16, as will be more fully explained herein below.

In operation, the structure of the two one-point adjustable orientation controls 53 and 65 and the nonadjustable restraining cables 66 and 68 in combination with their unique arrangement and connections about the inflatable bag 18 provides a drive system limiting all six degrees of freedom of the free end 16 to provide satisfactory steering. To start such steering, the bag 18 is initially inflated at a minimum pressure to put all of the cables 38, 40, 54, 56, 66 and 68 in a fully tensioned or taut condition.

More specifically, upon inflation, the air in bag 12 exerts a pressure between the ground base 22 and the rim 14. This integral gas pressure acts at the rim 14 so as to tension the cables 38, 40, 54, 56, 66 and 68. The effect of the pressure acting at the rim-attached securing members 30, 32 and 34 prevents the cables from going slack and from losing their taut condition. Moreover, the effect of tensions provided in the cables through the action of their associated drum and motor components augments the effect of the internal gas pressure in preventing the cables from going slack and from losing their taut condition.

In the taut condition, the cables 38, 40, 54, 56, 66 and 68, for practical purposes, behave as rigid links. As rigid links, the cables function to selectively limit the longitudinal travel or extension of the inflated bag 18 by predetermined amounts. The rim-secured rigid cables, as previously noted, resist the internal gas pressure acting at the securing member 30, 32 and 34. By thus resistance, they restrain an upward motion of the free bag end 16 at the securing members 30, 32 and 34. Moreover, the tensioned cables 38, 40, 54, 56, 66 and 68 assist in selectively limiting an angular displacement of the free bag end 16 in predetermined amounts.

Selective longitudinal and angular displacement of the free bag end 16 is primarily accomplished with the motor drums 48 and 62. The drums 48 and 62 initially wind or unwind the cables of the first and second adjustable position controls 53 and 65, respectively. For example, referring to FIGS. 1, 2 and 4, the plane of the free bag end 16, and thus the reflector 12 thereat, is in a first predetermined position. The first position represents an earlier longitudinal and angular displacement from a start position.

The first position also corresponds to respective predetermined amounts that the two control cable pairs 38, 40 and 54, 56 have been rotated or taken up on the drums 48 and 62, respectively, to restrain the free bag end 16 thereat. A further takeup or pay out of the two cable pairs 38, 40 and 54, 56 changes the restraint placed on the inflated bag 18 by the tensioned cables 38, 40, 54 and 56. The change in restraint orients the heliostat mirror 12 to a second position, which could be that of FIG. 4, in the event the two cables pairs 38, 40 and 54, 56 were taken up.

To further illustrate, when the right hand side of the rim 14, as viewed in FIG. 1, is lowered from the first position, the orientation control cables 38 and 40 are wound or taken up at the drum 48. Concurrently, the other orientation control cables 54 and 56 are paid out at the drum 62. In response to the action of the drums 48 and 62, the inflated bag 18 will both radially flex and longitudinally expand or contract in order to accommodate new cable lengths. Moreover, when the free bag end 16 is raised and lowered with both control cable pairs 38, 40 and 54, 56 rsponding in unison in like amounts, any sideways or radial movement of the free bag end 16 will be substantially controlled with control cable pair 38 and 40.

Additionally, the tensioned restraining cables 66 and 68, while behaving as rigid links with constant lengths, will cause the portion of the free bag end 16 adjacent the securing member 34 to pivot thereabout. This pivotng occurs as portions of the free bag end 16 adjacent the other securing members 30 and 32 are lowered or raised by their related drums 48 and 62. Further, during pivoting, the securing member 34 moves along an imaginary arc defined by the lengths of the cables 66 and 68.

The ability of the free bag end 16 to freely pivot about the fixed point of the securing member 34 is enhanced by the connection of the restraining cables 66 and 68 to the rim 14 with swedged-eye connectors. Moreover, the particular pivotal path of the free bag end 16 can be modified by repositioning the cable securements 30, 32 and 34 about the rim 14. Also, during pivoting, the tensioned restraining cables 66 and 68 stabilize the free bag end 16 by restraining the longitudinal extension thereof at the connection point 34.

From the foregoing, it will be apparent that incrementally adjusting the lengths of the tensioned cables in the two one-point, adjustable, position controls 53 and 65 steers the heliostat mirror 12 to a desired corresponding angular position. Moreover, for any particular combination of tensioned cable lengths there is one and only one position that the free bag end 16 can assume. As previously noted, this occurs because all of the six cables when taut behave as rigid bodies during steering. Moreover, the six cables are circumferentially arranged around the periphery of the free bag end 16 at desired points thereof in order to limit all six degrees of freedom of the free end 16. The adjustable control of these six degrees of freedom allow the longitudinal and the angular displacement of the free bag end 16 in three-dimensional space to be thoroughly defined or unrestrained with respect to steering.

However, it is not necessary for the support and maneuvering device 10 to control all six degrees of freedom to provide satisfactory steering for heliostat/collector tracking applications. For example, satisfactory steering may be accomplished with other embodiments of the present invention that limit only five degrees of freedom, as will become apparent herein below.

Moreover, with respect to achieving satisfactory steering, the torsional rigidity of the inflated bag 18 is not critical since, generally speaking, most torsional movement is thoroughly controlled by the six tensioned cables. Additionally, the six tensioned cables advantageously maintain the free bag end 16 in a fairly rigid fixed position, when wind forces or the like would otherwise disturb the free bag end position and, hence, the reflector 12 carried thereon.

It will be further apparent that desired ones of the plurality of cables 38, 40, 54, 56, 66 and 68 associated with the nonadjustable restraining and the adjustable orientation controls need not always constitute non-rigid flexible materials. This is also true for the cables employed in the remaining embodiments of FIGS. 5-9. For example, in steering, tracking or aiming applications that require the non-rigid flexible cables to frequently remain in a tensioned mode of operation, such cables could be readily replaced by rigid spar-like tensile members of wood, metal, or other rigid materials as will occur to those skilled in the art.

It will also be apparent that the function of the motors 52, 63 and 93 to adjust the cable lengths can be preprogrammed. Such preprogramming will enable the motors to rotate predetermined amounts throughout the course of the day in response to commands from a controller. The controller can command an amount of rotation based on sun angles, pedestal position to the receiver, etc., so as to steer the reflector 12 corresponding predetermined angular amounts that optimally reflect or direct the solar rays onto the receiver.

Figure 9:
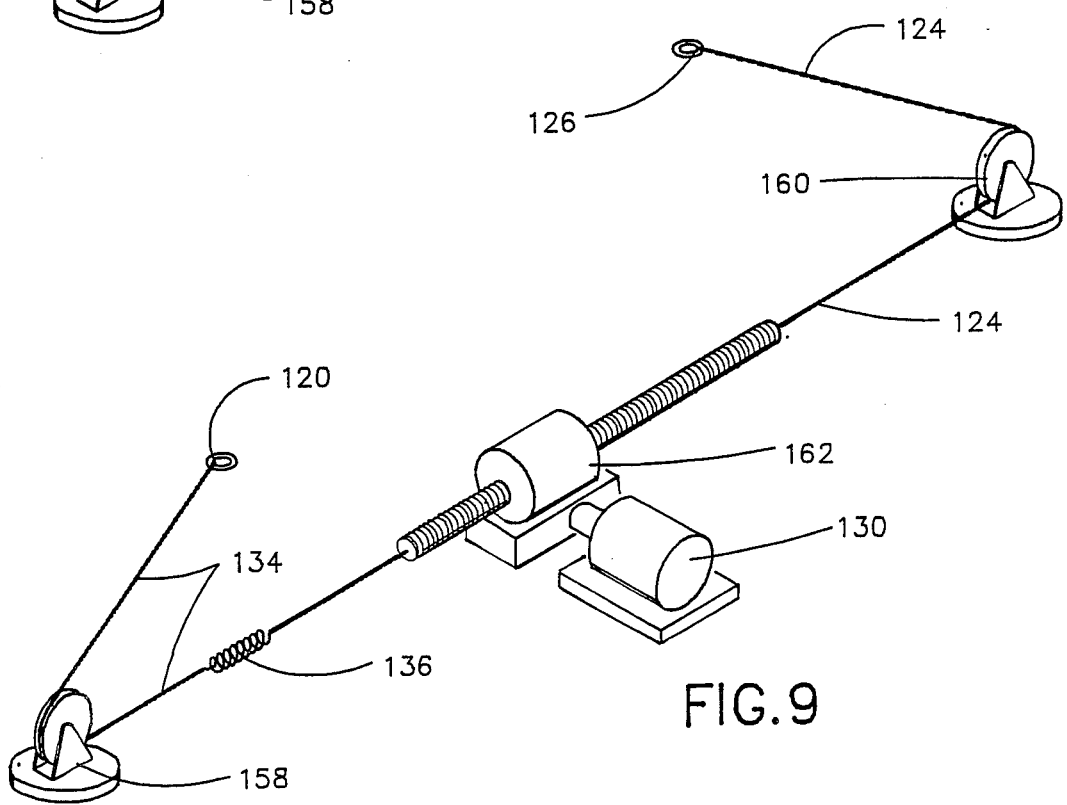
FIG. 9 is a fragmentary detailed perspective view illustrating a modification of the variant of FIG. 8.

Incidentally, the function to adjust the cable lengths is not limited to the motor and drum components. It can be performed by any other adjustable controlling means suitable for takeup and payout of the cables, as will occur to those skilled in the art. Two examples are a jackscrew and a hydraulic ram. The use of a jackscrew 162 is depicted at FIG. 9 and will be more fully described herein below.

Lastly, it will be apparent that the dimensions of the support and maneuvering device 10 are a matter of choice, depending upon a particular application intended therefor. More specifically, the lengths of the restraining cables 66 and 68 and of the orientation control cables 38, 40, 54, 56, will all vary among different applications and relative dimensions of different devices 10. This is also true with respect to the relative positioning of the ground rollers 42, 44, 58 and 60 and the ground anchors 70 and 72.

In the preferred heliostat/collector tracking application for a central receiver solar power system, it is contemplated that the reflector 12 will have a diameter in a range of from about three meters to about ten meters. Its diameter will be complementary to its vertical height. Similarly, the bag 18 will have a corresponding range of diameters complementary to its vertical height. Incidentally, regardless of the actual dimensions of the particular support and maneuvering device 10, the applicable lightweight constructing materials will provide significant cost advantages in comparison with many of the other known heliostat mirror support and drive devices of similar dimensions.

In keeping with the principal objects of the invention, each one of the remaining embodiments of FIGS. 5-14 describe the structure and function of particular exemplary cable assemblages, such as the one-point, adjustable, position control and the nonadjustable, restraining, cable control, and how such particular assemblages are arranged and connected about the rim of the inflatable bag to provide a desired steering motion. Hence, one skilled in the art will appreciate that the embodiments of FIGS. 5-14 are not limited to employing only the particular exemplary assemblages and cable rim arrangements described therein.

More specifically, the different assemblages of all the FIGS. 1-14 and their related cable-to-rim connections are interchangable with respect to use with the inflatable air bag. These assemblages may also be employed in any number of combinations. The particular combination need only limit the necessary degrees of freedom to effect satisfactory steering in all the desired directions, as will become more apparent herein below.

Referring now to FIG. 5, there is shown a variant of the first embodiment of FIGS. 1-4. The differences between the first embodiment of FIGS. 1-4 and the variant of FIG. 5 is that the fixed length cables 66 and 68 and ground anchors 70 and 72 of FIGS. 1-4 have been replaced by a third, one-point, adjustable, position control 80. The control 80 includes a cable securement 81, two cables 83 and 85, two pulleys 87 and 89, and a drum and motor assembly 91 and 93. It will be noted that the control 80 is identical in structure and function to the adjustable orientation controls 53 and 85. Thus, a detailed description of one will suffice for the other.

Figure 6:
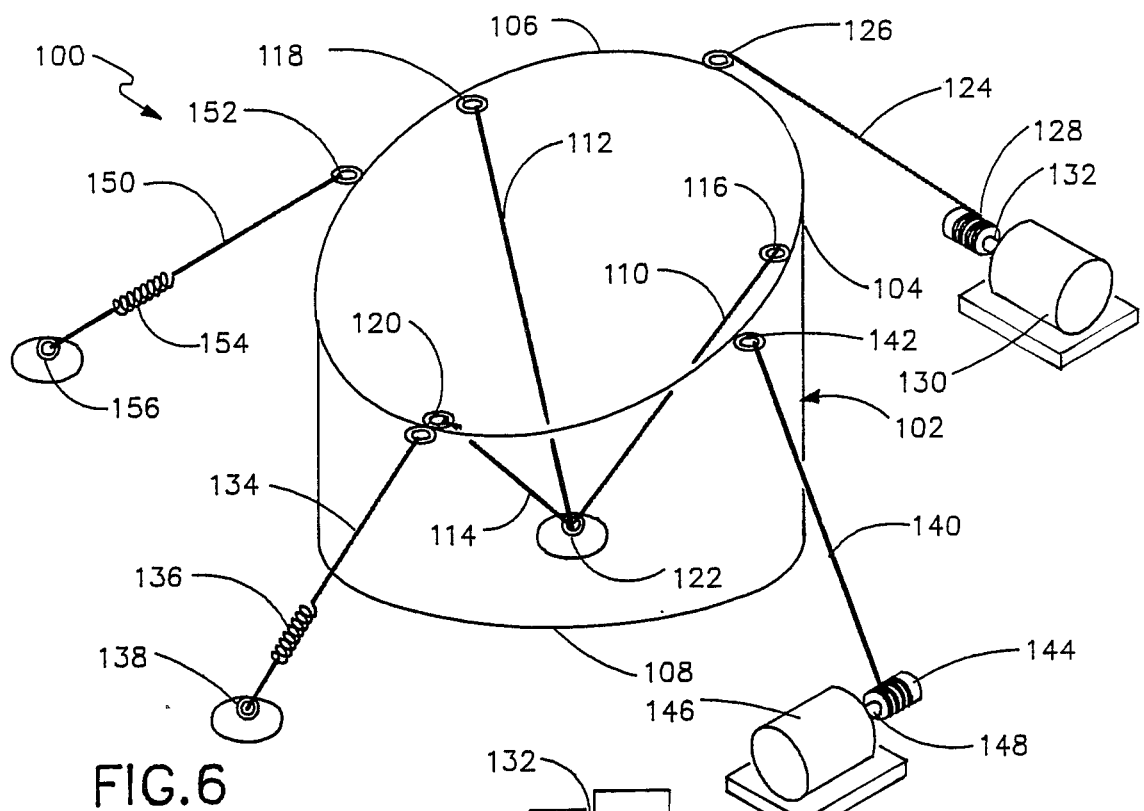
FIG. 6 is a simplified schematic perspective view of a second embodiment of the invention.
Figure 7:
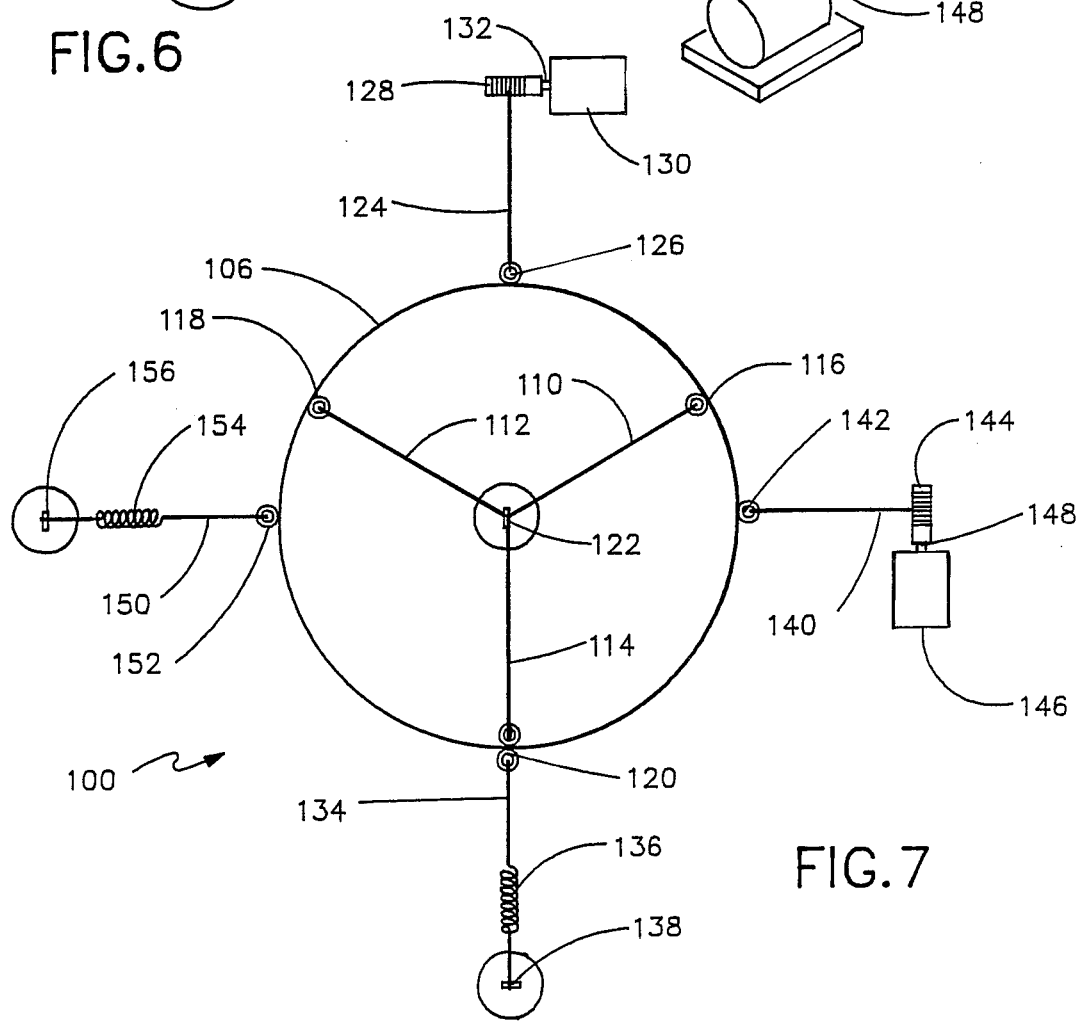
FIG. 7 is a simplified schematic plan view of the second embodiment of FIG. 6.

Referring now to FIGS. 6 and 7, there is shown a second embodiment of the support and maneuvering device of the present invention in a simplified schematic form. The second embodiment is generally indicated by the reference numeral 100. Attention is drawn to the fact that the mirror, the bag, the rim, the base, the clamping ring and the fan components of the device 100 are identical in structure and function to the mirror 12, the bag 18, the rim 14, the base 22, the clamping ring 24 and the fan 28 of the device 10. Thus, a description of these corresponding components of device 100 has been omitted for the purpose of clarity, since a description of the mirror, the rim, the base, the clamping ring and the fan components in FIGS. 1-4 will suffice for a description of those components appearing in FIGS. 6 and 7.

The device 100 includes an inflatable bag 102. The bag 102 has an upper movable or free bag end 104 connected to the rim 106 of the mirror, which rim 106 has been simply represented as a single circular line for the sake of clarity. Also, the bag 102 has a fixed end 108 connected to a circular base 109 in a manner previously described for the device 10 of FIG. 1.

First ends of three nonadjustable restraining cables 110, 112 and 114 are connected to the rim 106 at corresponding rim-attached cable securing members or connection points 116, 118 and 120. The cables 110, 112 and 114 are internal to the bag 102. The three connection points 116, 118 and 120 are circumferentially spaced about 120° from each other. As previously noted, the cable connections to the rim of the inflatable bag, the drum and motor components, the ground anchors and the pulleys are schematically represented. The actual connections for the cables 110, 112 and 114 are made in a manner similar to the cable connections described for the device 10 of FIG. 1.

Remaining ends of the cables 110, 112 and 114 are pivotally connected to a common ground anchor or junction point 122. Anchor 122 is secured to the ground at an interior central region of the circular bag base 109. The cables so connected form a sort of inverted tripod-type configuration. The anchor 122 defines an apex of the tripod, as is best illustrated in FIG. 6.

In keeping with the invention, the cables 110, 112 and 114 and their connections and arrangement about the bag 102 function as a nonadjustable, restraining cable control. When tensioned to a taut condition, the nonadjustable, restraining cables 110, 112 and 114 act as a rigid tripod. The tripod limits three degrees of freedom of the free end 104, one degree of freedom being associated with each one of the three cables 110, 112 and 114.

A first position control cable 124, which is characterized as a north cable for purposes of illustration, is connected at one end thereof to a north rim-attached, securing member or connection point 126. The connection point 126 is located at the free bag end 104. The cable 124 extends outside the inflatable bag 102 for operative connection to a drum 128. The drum 28 is, in turn, operatively connected to a motor 130 through a shaft 132. An angle of inclination defined by the cable 124, with respect to the ground and the free bag end 104, is a matter of choice. The choice depends upon a height of the inflatable bag 102. A preferred angular range, however, is from about 30° to about 90°.

An idler tensioning cable 134, which is characterized as a south cable for purposes of illustration, is fixed at one end to a south rim-attached, securing member or connection point 120. Incidentally, it will be seen that the connection point 120 and the associated cable 134 is circumferentially spaced about 180° from the connection point 126 and the associated cable 124. The idler tensioning cable 134 extends outside the inflatable bag 102 for connection to an idler or tensioning device 136.

The tensioning device 136 can be a passive element such as a spring, or can be an active element such as a winch, jackscrew, or hydraulic ram. In a preferred embodiment, the tensioning device 136 comprises a spring element. The spring element is preferred for simplicity and low manufacturing cost. The tensioning device 136, through a remaining end of the cable 134, is secured to a ground anchor 138.

In keeping with the invention, the cable pair 124 and 134 with their associated drum and motor components 128 and 130 and the tensioning device 136 function as an adjustable, north-south position control means. This control means limits one degree of freedom of the free end 104.

Also, in the adjustable, north-south position control, the cable 124 provides the primary restraining force at the securing member 126. The remaining cable 134 and the spring 136 provide an idler tension to the free bag end 104. The idler tension serves to balance the restraining force of cable 124, as will become more apparent herein below.

A second position control cable 140, which is characterized as an east cable for purposes of illustration, is fixed at one end to an east rim-attached, securing member or connection point 142 at the upper free bag end 104. A remaining end of the cable 140 extends outside the inflatable bag 102 for takeup and payout on a drum 144. The drum 144 is operatively connected to a motor 146 through a shaft 148.

Upon inspection of FIG. 6 it will be apparent that the east cable 140 and the north cable 124 include substantially similar cable-to-rim connections at their associated securing members 142 and 126. The cables 140 and 124 also include substantially identical cable adjustment and connection features at their associated drum and motor components 144, 146 and 128, 130.

An idler tensioning cable 150, which is characterized as a west cable for purposes of illustration, is connected at one end to a west rim-attached, securing member 152 or connection point. The connecting point 152 is located at the free bag end 104. A remaining end of the cable 150 extends outside the inflatable bag 102 for connection to a tensioning device 154. The tensioning device 154 is, in turn, connected to a ground anchor 156. It is evident that the west idler cable 150 and the south idler cable 134 include substantially identical cable connections and cable functions with respect to their respective tensioning devices 154 and 136, rim connection points 152 and 120, and anchor connections 156 and 138.

Referring now to FIG. 7, it will be seen that the cable securements 120, 126, 142 and 152 are positioned at 90° intervals about rim 106. This spacing conveniently aligns the securements 120, 126, 142 and 152 with the four compass directions corresponding to their north, south, east and west characterizations. The cable securements 126 and 142 in the present instance are positioned between the cable securements 116, 118 and 116, 120, respectively. Notably, the locations of the cable securements 126 and 142 are arbitrary, and they are preferably positioned to provide maximum stability of cable tensions for the associated internal cables 110, 112 and 114 during operation.

Also, pursuant to the invention, the cable pair 150 and 140 with associated drum and motor components 144 and 148 and tensioning device 154 function as an adjustable, east-west, position, control means. This control means limits one degree of freedom of the free bag end 104. As previously mentioned, the adjustable, north-south, position control means includes therein the cable pair 124 and 134, which limits one degree of freedom of the free end 104. The remaining cables 110, 112, 114, 124, and 140 each limit one degree of freedom of the free bag end 106. The final degree of freedom corresponds roughly to rotation of the free end 106 about an axis normal to the plane of the free end 106, which does not institute an error in steering or pointing of free end 106. This rotational motion is limited primarily by the torsional strength of the inflated bag 102.

In operating the device 10, it should be understood that the steering features of the north and south cables 124 and 134 and their associated components are substantially similar to the steering features of the east and west cables 150 and 140 and their associated components. The only difference is that the cable pair 124 and 134 generally provides steering in a north-south direction, while the cable pair 152 and 140 generally provides steering in an east-west direction. Since the north and south cable pair and its related components include the same structure and function as the east-west cable pair, an operational description of the north and south pair will suffice for the other.

Upon inflation, the cables 110, 112 and 114 initially are extended to their full length. The effect of the internal air pressure acting at the cable securements 116, 118, 120, 126, 142 and 152 and the tensions provided in the cables 124 and 134 by their drum and motor components put them in a taut condition. As previously noted, the internal gas pressure and the tensions derived from the motor and drum components prevent the cables from losing their taut condition. The taut condition is crucial. The cables 116, 118, 120, 126, 142 and 152 must remain in tension at all times throughout the range of motion of the bag free end 104 to effect satisfactory steering.

Referring now to the inverted tripod cable configuration, when suitably taut, the fixed anchor point 122 thereof functions as a pivot. The three cables 110, 112 and 114, in turn, enable the effected perimeter portions of the free bag end 104 to rotate about the pivot point 122. This pivoting is in response to a lateral force or force generally acting parallel to an imaginary plane in which the rim lies.

For example, as the north cable 124 is being wound, the position of the south cable securement 120 is incrementally raised and the position of north cable securement 126 is incrementally lowered by predetermined amounts. These amounts will correspond to the amounts being wound at the drum 128. Additionally, a wall portion of the bag 102 between the cable securements and the ground is compressed in reaction to the drum 128 being wound. The three cables 110, 112 and 114, in response to the action of the contracting bag and the gas pressure being exerted at the north cable securement, allow a tilting or rotation of the free bag end 104 about the pivot or anchor 122.

A similar tilting of the free bag end 104 about the pivot 122 occurs as the north cable 124 is paid out. Further, payout of the north cable 124 lowers the position of the south cable securement and raises the position of the north cable securement 126. Notably, during tilting, the payout or winding of the north cable 124 at drum 128 is enhanced by the tensions provided by the south tensioning device 136 and the east tensioning device 154. These tensions are augmented by the internal gas pressure within the bag 102.

Additionally, during rotation, the direct action of the south tensioning device 136 in combination with the indirect action of the east-west cable pair 140 and 150 and their associated components serves to maintain suitably taut tensions in the north-south cable pair 124 and 134 for effecting satisfactory steering. More specifically, the south tensioning device 136 stretches, while attempting to maintain its orginal shape, as a direct response to the takeup action of the associated north drum component 128. Similarly, the south tensioning device 136 contracts, while attempting to keep its original shape, as a direct response to the payout action of the drum component 128. By such stretching and contracting actions, the south tensioning device provides opposing corresponding tensile forces or tensions in the north cable 124.

In a like manner, the east tensioning device 154 also stretches and contracts in an indirect response to the action of the north tensioning device 136 and the drum and motor components 128 and 130. These indirect stretching and contracting actions assist the north-south cable pair 124 and 134 in maintaining suitable tensions in the cables 124 and 134 to effect the desired angular displacement in the north-south direction. From the foregoing, it is evident that an amount of deformation in the tensioning device, and thus, the magnitude of the opposing tensions created in the cables 124 and 140 are adjusted through the two pairs of associated motor and drum components 130, 128 and 146, 144, respectively.

Having observed the details of the north-south steering control, it will be seen, as mentioned above, that the east-west steering control provides the same structure and function as the north-south steering control. The difference is that, in east-west steering, the north-south cable pair 124 and 136 and its related components directly act to assist the east-west cable pair 140 and 150 in steering.

It will now be appreciated that the respective positions of the drum and motor components 128 and 130 and the tensioning device 136 of the north-south position control can be reversed if desired. A similar reversal of the position of the drum and motor components 144 and 146 and the tensioning device 154 of the east-west position control can also be made without affecting operation of the device. In addition, the invention is not limited to steering the free bag end 104 with only the north-south and east-west controls. The bag 102 can be provided with any suitable number of different position controlling means from the other embodiments of the present invention to effect a satisfactory steering.

It will also be appreciated that, as previously noted, the cable attachments to the bag 102 are not limited to its periphery. Such cable attachments may be made at other locations on the device 100 or at the article carried thereon, as will occur to those skilled in the art. They need only be suitable for effecting satisfactory aiming, tracking or steering.

For example, the mirror structure could conveniently be adapted to receive a reflector support structure having a centrally located fastener means. Such a fastener means could be employed to couple thereto the restraining cables 112, 114 and 116 by inverting their tripod-configured cable assemblage. The fastener would function as the common anchor or junction point for the first ends of the cables 112, 114 and 116. The opposed cable ends would be connected to the bag base in a spaced arrangement. Moreover, the remaining orientation control cables 124, 140, 150 and 136 could be attached at any convenient point on the reflector support, not necessarily at its periphery.

Figure 8:
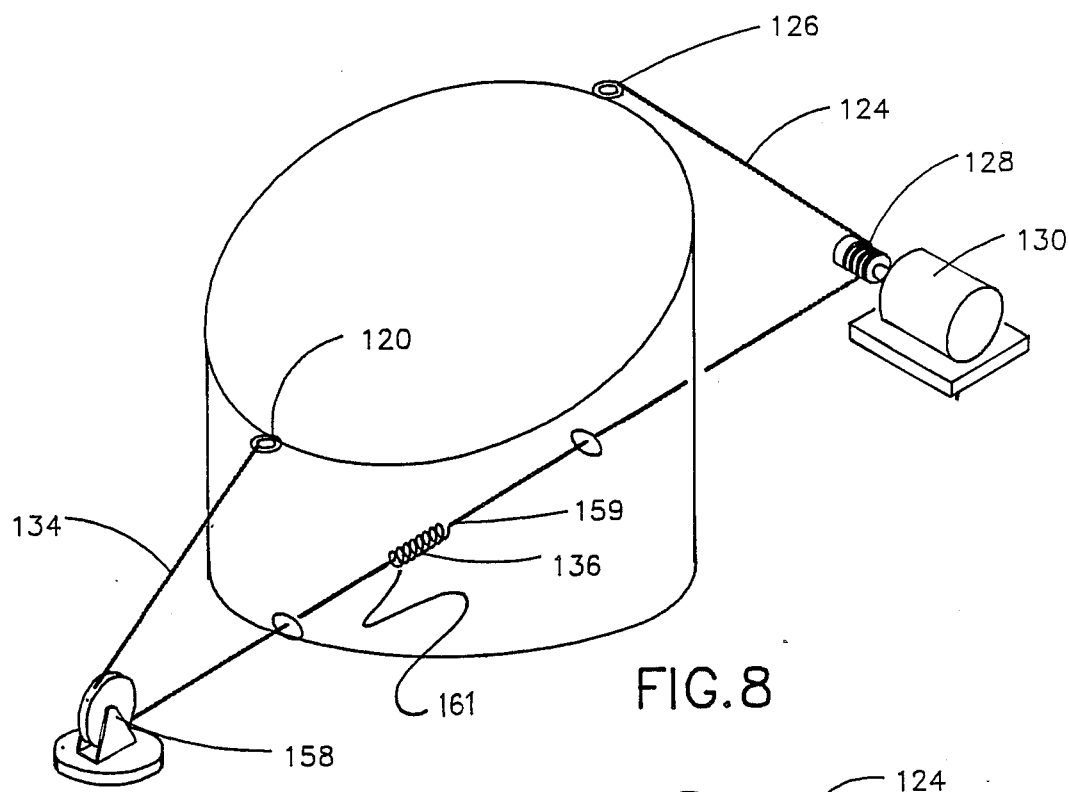
FIG. 8 is a simplified schematic perspective view illustrating a variant of an adjustable orientation control of the second embodiment of FIG. 6.

Referring again to FIG. 6, and particularly to FIG. 8, there is shown a variant in the north-south, adjustable, position control of the embodiment of FIG. 6. A difference between the north-south position control of FIG. 6 and FIG. 8 is that the ground anchor 138 has been replaced by a ground roller 158. Another difference is that idler cable 134 is connected between the securing member 120 and a first end 161 of a tensioning device 136 through a ground roller 158. Also, the control cable 124 is connected to a second opposed end 159 of the tensioning device 136 through the drum 128.

The tensioning element 136 is preferably in the form of a spring. The spring serves to create suitable opposing tensions in portions of the cable 134 between the securing member 120 and the pulley 158. It also creates suitable tensions in a portion of the cable 124 between the securing member 126 and the drum 128.

In operation, as the drum 128 of the motor 130 rotates in a first direction to lower the portion of the free bag end 104 adjacent the cable securement 126, tension between the cable securement 126 and the drum 128 is increased. Concurrently, tensions in the device 136 are relaxed with a corresponding relaxation of the tensions in the cable 134. The free bag end 104 is, thereby, tilted toward the north as the free bag end 104 is rotated about the ground anchor 122. That is to say, the cable securement 126 is lowered, while the cable securement 120 is raised. A converse operation occurs as the motor 130 is rotated in an opposite direction. Having observed the details of the variant of the north-south orientation control of FIG. 8, it is obvious that this variant may be positioned at other rim locations to effect steering in a different direction. An example is an east-west direction.

Referring now to FIG. 9, a modification of the variant of FIG. 8 is illustrated. The difference between the variant of FIG. 8 and the modification of FIG. 9 is that the drum and motor components 128 and 130 of FIG. 8 are replaced in FIG. 9 by a ground roller 160 and a series-connected cable-adjustment means 162. The cable adjustment means 162 is preferably in the form of a jackscrew, while the ground roller 160 is preferably ion the form of a pulley. It being understood that the adjustment means 162 of FIG. 9 is not limited to comprising a jackscrew. It may comprise other suitable cable adjustment means, as will occur to those skilled in the art.

In operation, as the jackscrew 162 is driven by the motor 130 in first and second directions, the screw body reciprocates back and forth in an axial direction. The ends of the cable 124 and 136 that are connected to different opposed ends of the jackscrew 162 follow the axial movement of the jackscrew body. Notably, the tensioning function provided by the tensioning device 136 as a result of the axial forces imparted thereto is the same function as that provided by the spring element 136 of the variant of FIG. 8.

Various changes and modifications made, as will be evident to those skilled in the art, may be introduced in the foregoing embodiments and practices without departing from the support and manuevering device invention. Thus, the particularly illustrated embodiments and disclosed practices are intended in an illustrative and not in a limiting sense. The true spirit and scope of the invention is set forth in the following claims.

The embodiments of the invention in which an exclusive property or privilege is claimed are defined as follows:

1. A support and maneuvering device securable to a ground surface and adapted for mounting a mechanism to receive solar energy from the sun, said device comprising:
   a. flexible, inflatable enclosure having a fixed end and a movable end, the movable end of the enclosure being collapsible toward the fixed end to a contracted position when said enclosure is in a noninflated condition, and said movable end being movable away from said fixed end to an extended position when said enclosure is in an inflated condition;
   b. means for mounting said solar energy receiving mechanism to said movable end;
   c. means for inflating said enclosure to any selected position between said contracted position and a fully extended position;
   d. at least three position controlling means disposed about said movable end to adjust said movable end in conjunction with said inflation means by predetermined amounts to control the angle and attitude at which said solar energy receiving mechanism is oriented relative to the position of the sun and said ground surface, said position controlling means limiting a selected number of degrees of freedom of said movable end to transmit a steering motion to said movable end to continuously control the angular position thereof; and e. at least two of said position controlling means comprising adjustable, position controlling means, each one of said adjustable position controlling means being connected to different corresponding portions of said movable end to move said different corresponding portions of said movable end said predetermined amounts and bending said enclosure to control the angle at which said movable end is oriented relative to the sun to continuously optimize the desired angle and attitude of said solar energy receiving mechanism relative to the sun.

2. A device as claimed in claim 1, wherein said position controlling means limit at least five degrees of freedom of said movable end.

3. The device as claimed in claim 1, wherein all of said position controlling means comprise adjustable, position, controlling means.

4. The device as claimed in claim 1, wherein at least one of said position controlling means comprises a nonadjustable restraining means connected to a corresponding portion of said enclosure for moving said corresponding portion in a manner to assist said adjustable, position controlling means in controlling the angle at which said movable end is being oriented.

5. The device as claimed in claim 4, further including a mounting ring disposed about the movable end of said enclosure, said mounting ring including a plurality of circumferentially, spaced-apart connection members, each one of said position controlling means being connected to one of said connection member, said plurality of connection members being positioned and spaced about said movable end in a manner to assist said position controlling means in providing a steering motion to said movable end in virtually all desired directions.

6. The device as claimed in claim 5, wherein each one of said plurality of connection members comprise fastener means attached to said mounting ring for connection to one of said position controlling means.

7. The device as claimed in claim 5, wherein each one of said position controlling means includes at least one elongated flexible tensile member, each said elongated flexible tensile member being operatively connected between one of said plurality of connection members and means secured to said ground surface.

8. The device as claimed in claim 7, wherein said monadjustable restraining means includes at least one said elongated flexible tensile member, and wherein each of said adjustable position controlling means includes at least two of said elongated flexible tensile members, each of said elongated flexible tensile members for each said position controlling means having first regions thereof commonly connected to a single corresponding one of said plurality of connection members and having second regions connected to said ground surface securing means.

9. The device as claimed in claim 7, wherein said nonadjustable restraining means includes at least two of said elongated flexible tensile members, said elongated flexible tensile members of said nonadjustable restraining means having first regions thereof commonly connected to a corresponding one of said plurality of connection members and having second regions connected to said ground surface securing means.

10. The device as claimed in claim 7, wherein each one of said adjustable position controlling means include a pair of said elongated flexible tensile members, each one of said two elongated flexible tensile members for a first pair of said adjustable controlling members having a first region connected to one of said plurality of connection members, and having a second region connected to said ground surface, each one of said two elongated flexible tensile members for the remaining pair of said adjustable controlling members having a first region connected to a different corresponding one of said plurality of connection members and having a second region connected to said ground surface.

11. The device as claimed in claim 10, wherein said at least one nonadjustable restraining means includes at least two of said elongated tensile members, each one of said at least two elongated flexible tensile members of said nonadjustable restraining means having first regions commonly connected to a single corresponding one of said plurality of connection members and having second regions connected to said ground region.

12. A device as claimed in claim 7 wherein said nonadjustable restraining means includes at least three of said elongated flexible tensile members, said at least three elongated flexible tensile members for said nonadjustable restraining means being located within said inflatable enclosure, each one of said three elongated flexible tensile means having a first terminal end connected to different corresponding one of said plurality of connection points and having opposed terminal ends connected to a common portion of said ground surface so as to form an inverted tripod-like configuration.

13. The device as claimed in claim 7, wherein each one of said position controlling means comprises a pair of said elongated flexible tensile members, each said pair of elongated flexible tensile members having frist regions thereof connected to different corresponding ones of said plurality of connection members at said movable end and having second regions connected to said ground surface securing means.

14. The device as claimed in claim 13, wherein each one of said adjustable position controlling means includes a drive means for lengthening and shortening each said pair of elongated tensile members at predetermined amounts, the angle at which said movable end is being oriented corresponding to said predetermined amounts that said drive means effects in shortening and lengthening each said pair of elongated tensile members, said drive means being spaced from said movable end and being operatively connected between an associated pair of said elongated tensile flexible members and said ground surface for effecting said lengthening and shortening of said pair of elongated tensile members.

15. The device as claimed in claim 14, wherein said nonadjustable restraining means includes only one flexible tensile member, said nonadjustable restraining means further including a spring means for assisting the two drive means for said adjustable position controlling means in lengthening and shortening each said pair of elongated tensile members, said spring means being operatively connected intermediate said particular connection point for said at least one nonadjustable restraining means and said ground surface.

16. The device as claimed in claim 15, wherein at least one of said adjustable, position, controlling means includes a spring means for assisting said adjustable, position, controlling means in lengthening and shortening each said pair of elongated tensile members, said spring means being connected in series with one of said elongated tensile members of said pair of elongated tensile members associated therewith.

17. The device as claimed in claim 14, wherein a first one of said adjustable, position controlling means include a pair of elongated flexible tensile members, each elongated flexible tensile member for the first one of said adjustable, position controlling means having a first region thereof commonly connected to a single corresponding common connection member of said plurality of connection members and a separate region thereof connected to a roller means, said drive means associated with said first one of said adjustable, position controlling means being connected intermediate to each one of the roller means for said pair of elongated flexible tensile members, and said two roller means being spaced-apart and connected to said ground surface.

18. The device as claimed in claim 17, wherein the remaining one of said at least two adjustable, position, controlling means includes a pair of elongated tensile members, each elongated flexible tensile members of said pair for said remaining adjustable, position, controlling means having a first terminal end connected to a different corresponding one of said plurality of connection members and having an opposed terminal end connected to a corresponding one of said two spaced-apart roller means, said drive means associated with said remaining adjustable, position, controlling means being connected intermediate said two spaced-apart roller means.

19. A method for supporting and adjustably maneuvering a device to receive solar energy from the sun, said method comprising:
   a. providing a flexible inflatable enclosure with a base end for mounting to a ground surface and a movable end for receiving the solar energy receiver thereon;
   b. having said movable end collapsible toward the base end, when the enclosure is noninflated, and having said movable end movable away from said base end to a predetermined extended position, when said enclosure is in an inflated condition;
   c. securing the base end of said enclosure to a fixed base;
   d. providing said enclosure with a plurality of position controlling means for moving different portions of said movable end by predetermined amounts and bending said enclosure to control an angle and attitude at which said solar energy receiving mechanism on said movable end is oriented relative to the position of the sun and the ground surface;
   e. arranging each one of said plurality of position controlling means about said enclosure so as to limit a suitable number of degrees of freedom of said movable end to transmit a steering motion to said movable end and control the angle and attitude position thereof;
   f. operatively coupling said plurality of position controlling means between said ground surface and said inflatable enclosure;
   g. inflating said enclosure; and
   h. adjustably steering said movable end in a desired direction using said plurality of position controlling means to selectively move said different portions of said movable end and bend said enclosure in suitable directions to control the angle and attitude at which said movable end is oriented relative to the sun continuously optimize the desired angle and attitude of the solar energy receiving mechanism relative to the sun.

* * * * *